United States Patent

Lachat

[11] Patent Number: 5,853,191
[45] Date of Patent: Dec. 29, 1998

[54] VEHICLE RESTRAINT SYSTEM WITH INFLATION CONTROL

[75] Inventor: Michael J. Lachat, Shelby Township, Mich.

[73] Assignee: AlliedSignal Inc., Morristown, N.J.

[21] Appl. No.: 796,259

[22] Filed: Feb. 6, 1997

[51] Int. Cl.[6] .................................................. B60R 21/22
[52] U.S. Cl. .................... 280/730.2; 280/743.2; 280/729
[58] Field of Search ........................... 200/729, 730.2, 200/739, 743.2

[56] References Cited

U.S. PATENT DOCUMENTS

| 4,262,931 | 4/1981 | Strasser et al. | 280/729 |
| 5,405,166 | 4/1995 | Rogerson | 280/739 |
| 5,692,774 | 12/1997 | Acker et al. | 280/729 |

FOREIGN PATENT DOCUMENTS 0 593 172  4/1994  European Pat. Off. ............... 280/729

Primary Examiner—Kenneth R. Rice
Attorney, Agent, or Firm—Markell Seitzman

[57] ABSTRACT

A vehicle restraint system for side impact protection includes an inflatable air bag having first and second chambers separated by a panel having an aperture to permit inflation gas to flow from one chamber to the other. A safety flap is partially secured to the separator panel and has an aperture initially aligned with the aperture of the separator panel. The air bag detects the presence of an out of position seat occupant in which case the safety flap partially breaks away and moves the apertures out of alignment, thereby at least partially limiting the flow of inflation gas through the separator panel.

13 Claims, 4 Drawing Sheets

VEHICLE RESTRAINT SYSTEM WITH INFLATION CONTROL

BACKGROUND AND SUMMARY OF THE INVENTION

The present invention generally relates to a vehicle restraint system, and more specifically to an air bag having an internal inflation control.

As is known in the art, air bags must be able to be filled rapidly to protect the occupant, but slow enough to limit the forces imparted to the occupant, especially the out-of-position occupant. While various methods and devices have been adapted in conjunction with front mounted air bags to detect out of position occupants, e.g. small children, in the front seat, this condition has not been addressed with respect to side impact air bags. Side impact air bags are mounted in the vicinity of the side of a vehicle seat and are adapted to deploy between the seated occupant and the side or door of the vehicle to protect the occupant from side impact collisions. A side mounted air bag configured for optimum protection of an adult may not provide optimum cushioning for a child. Because the child is smaller, the air bag should have most of its cushioning effect lower down with respect to the seat. For an adult, however, the air bag should provide protection from the seat cushion to the top of the backrest. It is an object of the present invention to provide a side impact air bag system which responds to an out-of-position occupant and controls the inflation of the air bag to provide a more effective distribution of the cushioning protection of the air bag.

Accordingly, a vehicle restraint system for mounting in the interior of a vehicle is provided herein. The vehicle restraint system comprises a housing, an inflator for providing inflation gas to an inflatable cushion, and an inflatable cushion mounted to the housing. The inflatable cushion has an interior divided into first and second chambers by a separator panel, each chamber being expandable from an initial unfilled configuration to an inflated configuration. The cushion has an inlet for receiving gas from the inflator into the first chamber. The separator panel has a first aperture to permit gas to flow from the first chamber to the second chamber, the first and second chambers being sequentially inflated. The restraint system also includes valve means for regulating the flow of inflation gas from the first chamber to the second chamber. The valve means can comprise a flap attached to the separator panel and having a second aperture initially aligned with the first aperture to define a maximum sized channel through which the inflation gas can flow. At least a portion of the flap is movable relative to the first aperture to a position wherein the second aperture is laterally offset from the first aperture to at least partially close the channel through which the inflation gas can flow.

Many other objects and purposes of the invention will be clear from the following detailed description of the drawings.

DETAILED DESCRIPTION OF THE DRAWINGS

Figure 1:
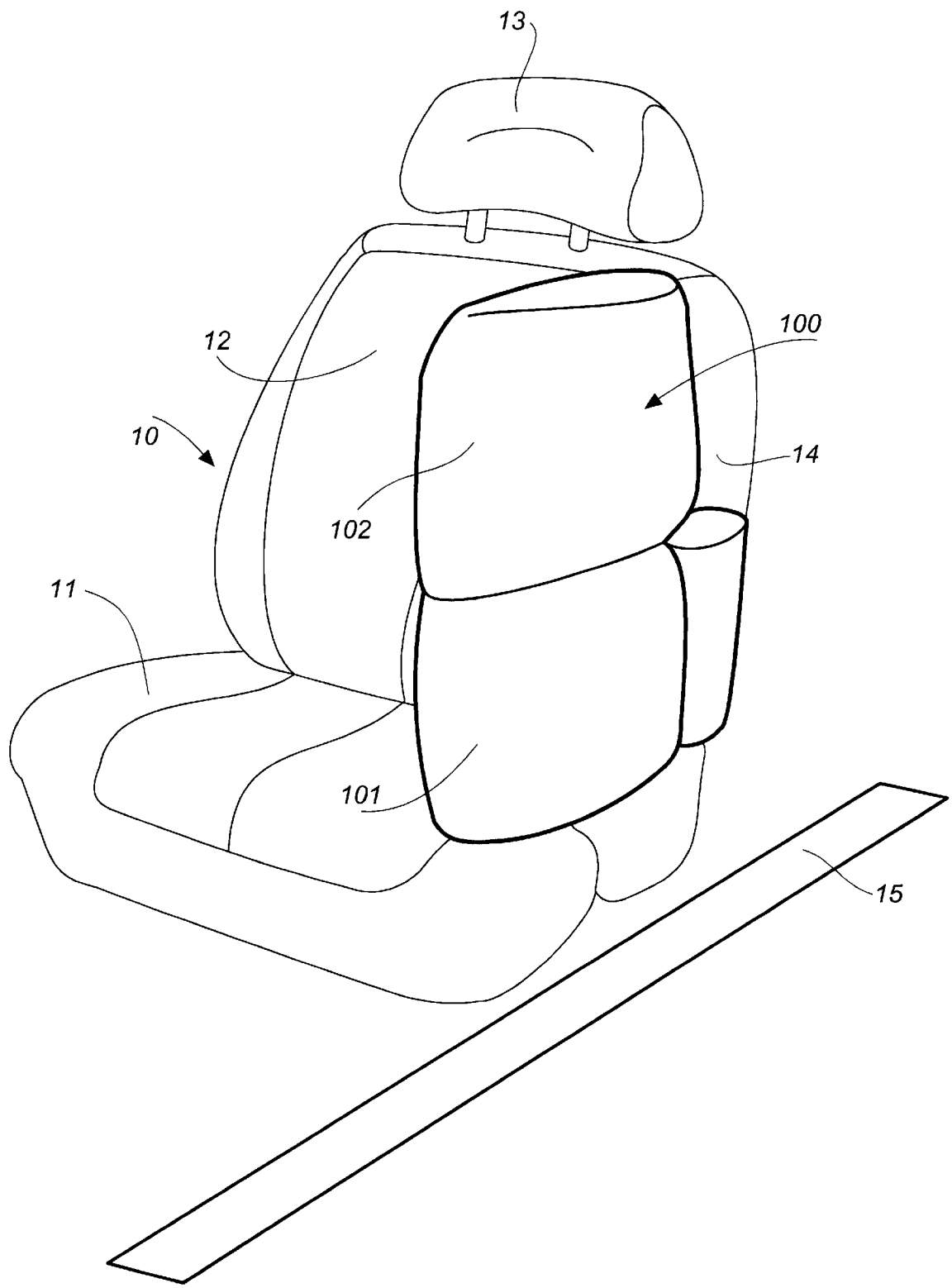
FIG. 1 is a perspective view illustrating a vehicle seat with a deployed air bag.

Referring now to FIG. 1 a side impact air bag system is shown with the inflatable air bag cushion 100 in deployed condition. Air bag cushion 100 is optionally mounted to the side 14 of vehicle seat 10 having a seat cushion 11, back rest 12, and head support 13. Air bag cushion 100 is adapted to provide cushioning effect in the event of an impact to side 15 of the vehicle. The vehicle can be an automobile, bus, truck, train, aircraft, or any other like means of conveyance. Upon impact, such as during a collision, a gas generating device within the vehicle restraint system, i.e. the inflator, produces a quantity of gas to inflate air bag cushion 100. Inflators typically employ pyrotechnic compositions to generate the inflation gas. Such inflators are known and commonly used. See for example U.S. Pat. No. 5,547,214 which is directed to a side impact air bag system and which is herein incorporated by reference.

As can be appreciated by one skilled in the art, an out-of-position occupant such as a child may need to have fuller inflation of the bottom portion of the air bag. Whereas a larger person, such as an adult, may need to have a more even distribution of the inflation gas to protect the upper part of the body with an inflated top portion of the air bag.

Figure 2:
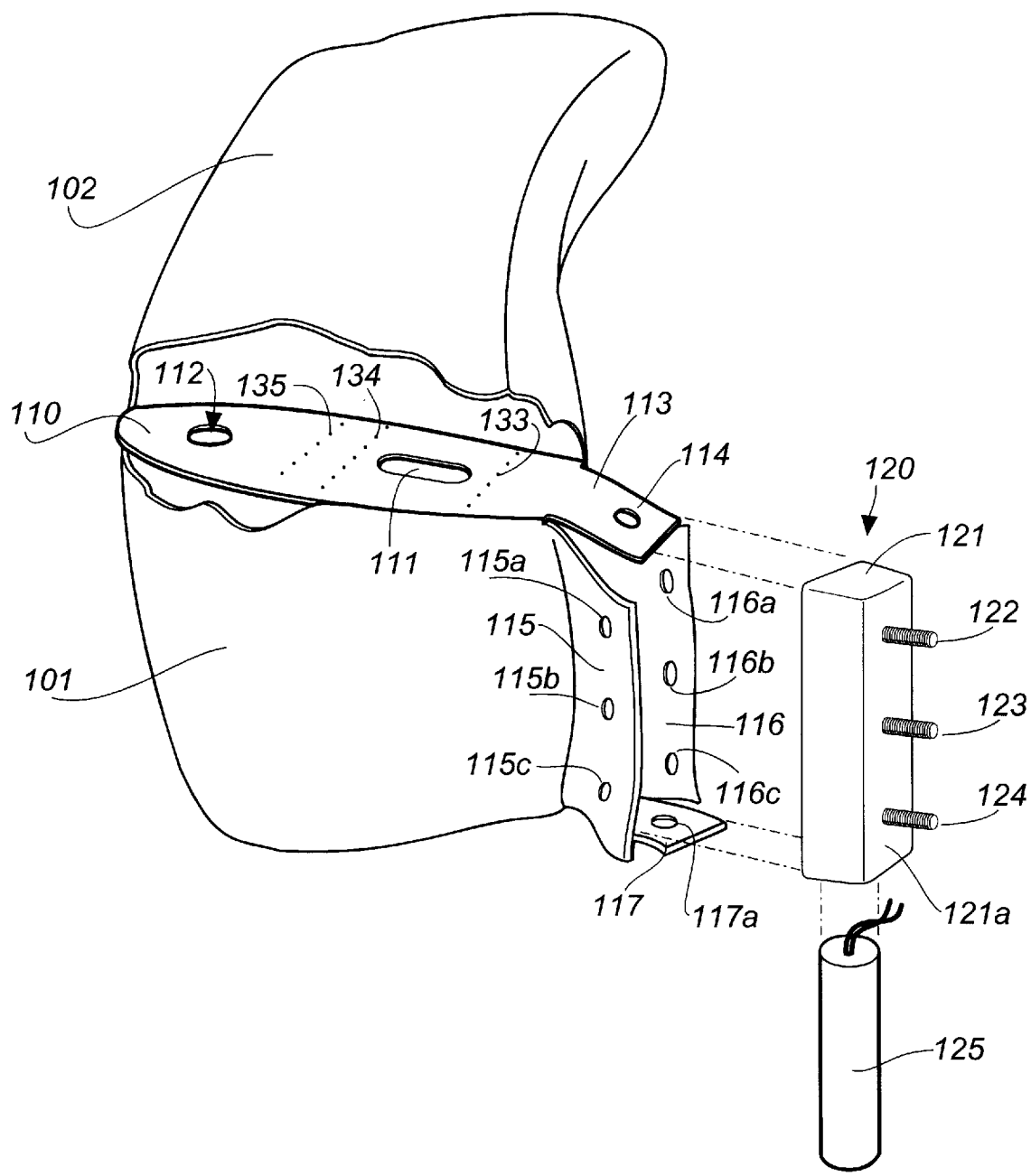
FIG. 2 is an exploded perspective view illustrating the air bag.
Figure 3:
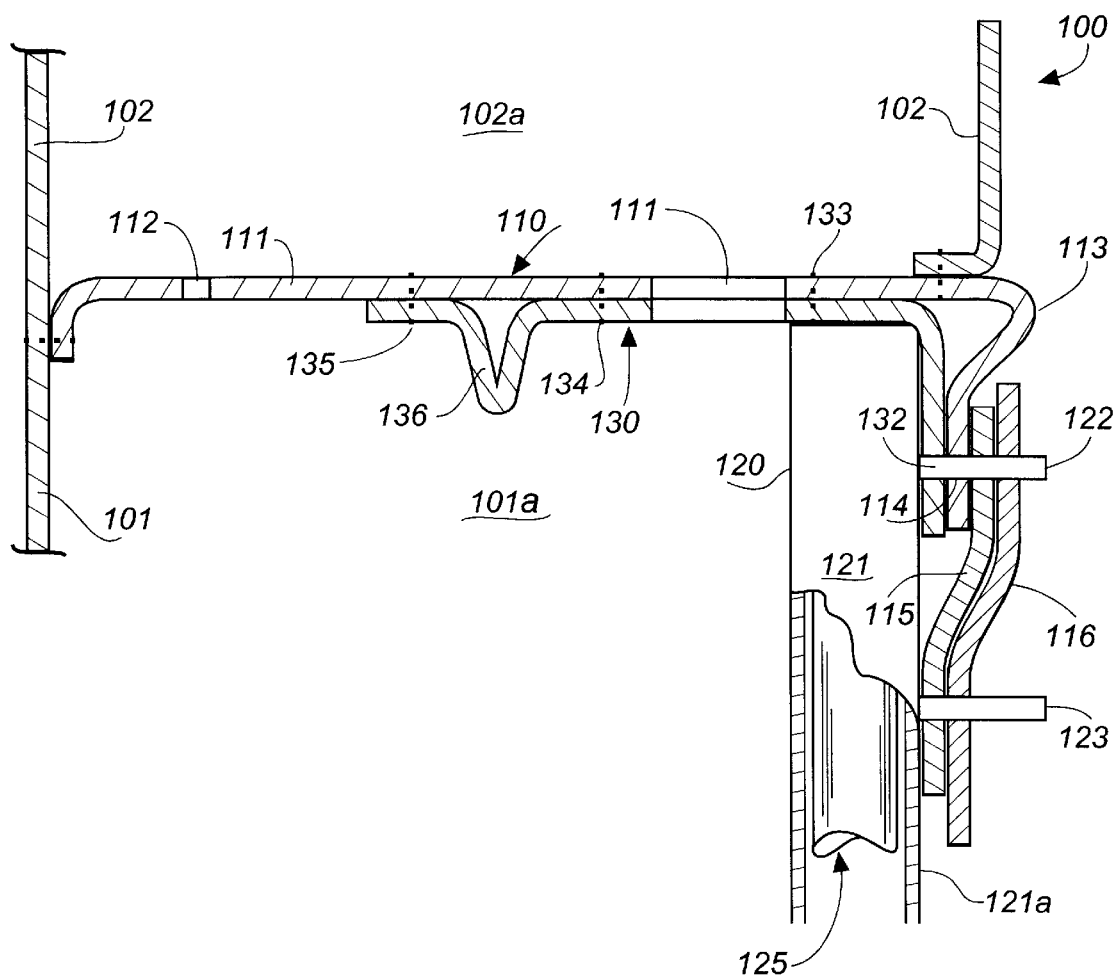
FIG. 3 is a sectional side view illustrating the interior venting system of the air bag.

Referring now to FIGS. 2 and 3, the thoracic section 101 and head section 102 respectively define a first interior chamber 101a and second interior chamber 102a of the air bag cushion 100, respectively, for sequential reception of inflation gas. The thoracic section 101 is the first section to receive the inflation gas. The gas then flows from the thoracic section 101 to the head section 102 through the venting system described below. The thoracic and head sections, 101 and 102, are separated by a separator panel 110 which extends laterally across the interior of the air bag cushion at about the mid section thereof. The separator panel 110 has two vent apertures: an elongated aperture 111 which, in combination with aperture 131 described below, forms a variable diameter channel through which the inflation gas can flow, and an auxiliary vent aperture 112. By way of illustration, vent aperture 111 can have an elongated oval shape and can be about 60 mm in length oriented in the direction of relative movement between the separator panel 110 and the safety flap 130. Auxiliary vent aperture 112 can be about 35 mm in diameter with a circular shape. Slack flap 113 is part of the separator panel 110 and extends around and over the top of inflator housing 120 and across wall 121a of frame 121. Stud 122, which projects laterally from frame 121, is disposed through stud hole 114. Studs 123 and 124 are substantially parallel to stud 122. Side flaps 115 and 116 are also disposed across wall 121a of frame 121 with studs 122, 123, and 124 disposed through stud holes 115a and 116a, 115b and 116b, and 115c and 116c, respectively. Bottom flap 117 is folded up across wall 121 with stud 124 disposed through stud hole 117a of bottom flap 117. Inflator housing 120 includes an elongated frame 121 having a space for mounting an inflator unit 125. Inflator housing 120 is positioned within the interior of the thoracic section 102, but is mounted by means of studs 122, 123, and 124 to a mounting frame (not shown) which is part of or attached to the vehicle seat 10 or to some other support in the body of the vehicle.

Figure 4:
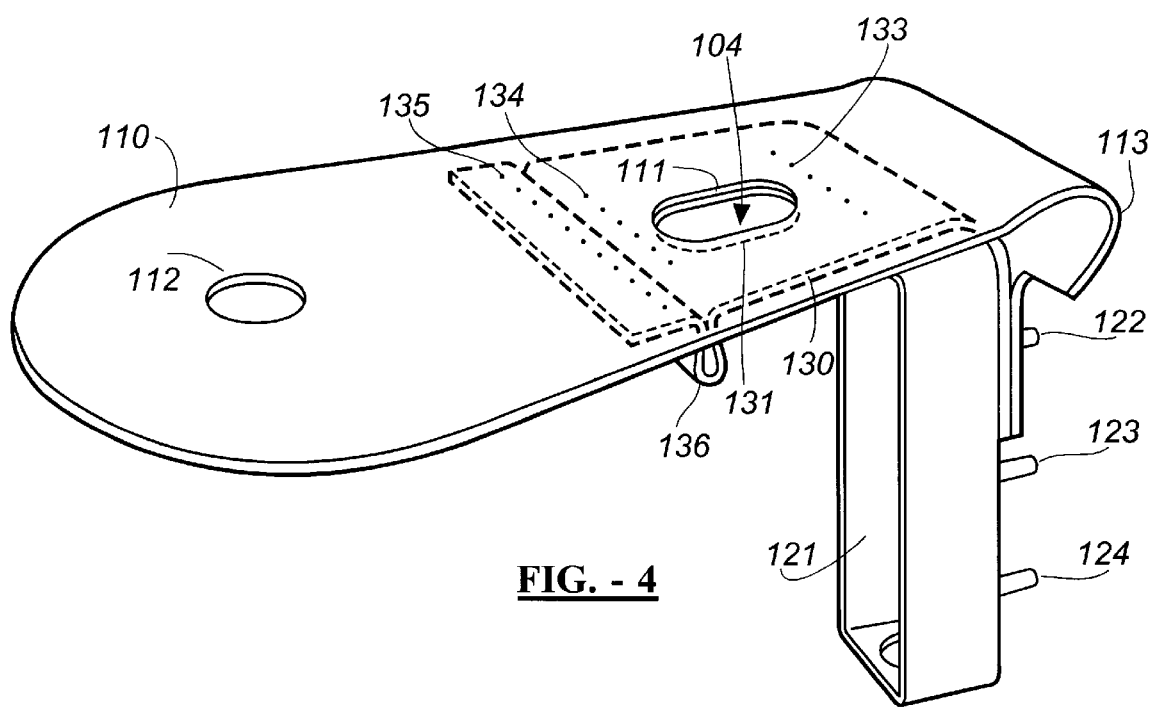
FIGS. 4 and 5 are perspective views of the separator panel and interior venting system of the air bag.

Referring now to FIGS. 3 and 4, safety flap 130 is attached to separator panel 110 by three lines of stitches. When air bag cushion 100 is inflated, a shearing force is generated between the separator panel 110 and the safety flap 130, as explained below. Stitch line 135 is a line of permanent stitches and is adapted to withstand the full shearing force generated during the inflation of air bag cushion 100. Stitch line 135 provides means for permanent attachment. Other means such as adhesive bonding, heat bonding, and the like can alternatively be used. Stitch lines 133 and 134 are breakaway stitches adapted to break when a predetermined amount of shearing force is applied during inflation of the air bag cushion 100. Stitch lines 133 and 134 provide means for temporary attachment. Other means for temporary attachment can alternatively be used. Vent aperture 131 of the safety flap is preferably an elongated aperture of the same size and configuration as vent aperture 111 of the separator panel. Initially both vent apertures 111 and 131 are in alignment to present a maximum size channel 104 to permit air flow from the thoracic section 101 to the head portion 102. Vent aperture 131 is positioned between the two breakaway stitch lines 134 and 133.

Safety flap 130 includes an expansion pleat 136 which is located between permanent stitch line 135 and breakaway stitch line 134. The expansion pleat is oriented in a direction transverse to the linear movement of the safety flap 130 relative to the separator panel 110. Safety flap 130 includes a stud hole 132 through which stud 122 is disposed. Safety flap 130 is fastened to the inflator housing frame 121 with little or no slack. Thus when air bag cushion 100 is inflated, only slack from expansion pleat 136 can be taken up. Expansion pleat 136 is released for expansion in response to the breakage of breakaway stitch lines 134 and 133 to permit relative sliding movement between separator panel 110 and at least a portion of safety flap 130.

Figure 5:
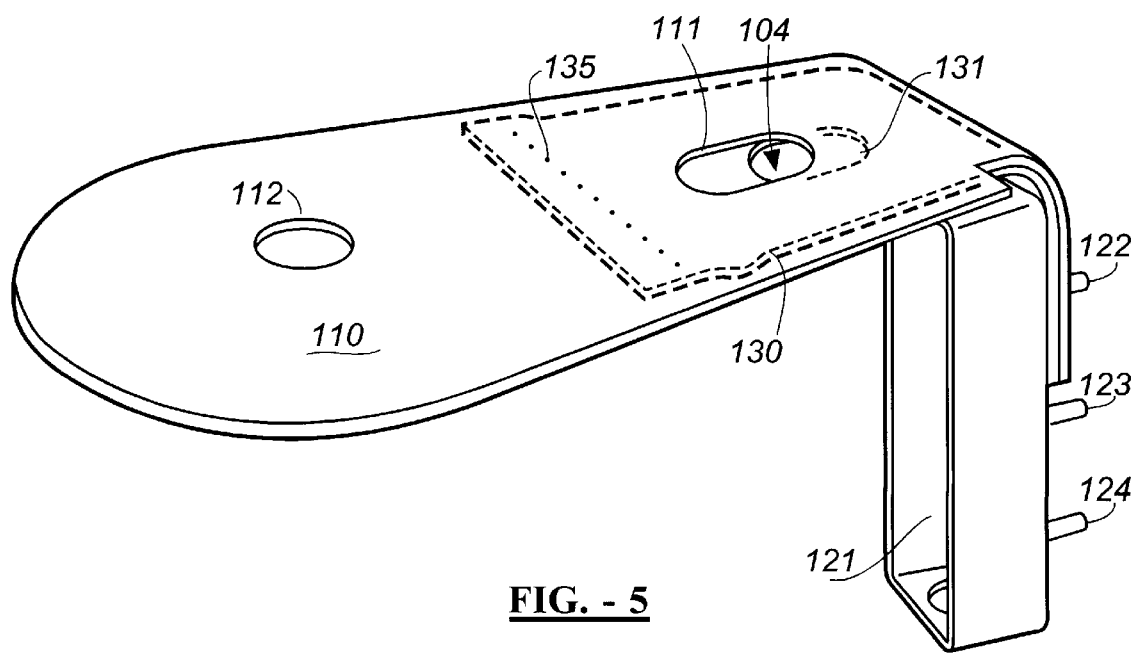

Referring also now to FIG. 5, the thoracic section 101 expands when inflator 125 discharges the inflation gas therein. Upon at least partial deployment, if thoracic section 101 is prevented from full expansion because of the presence of a full sized occupant in the vehicle seat, the breakaway stitches 133, 134 remain intact, thereby maintaining the safety flap 130 in its initial position and keeping vent apertures 111 and 131 in alignment for maximum flow of inflation gas through channel 104 into the head portion 102 of the air bag. However, if an occupant, such as an unbelted child in an improper position, occupies the vehicle seat, the thoracic section 101 expands more fully in inverse proportion to the size of the occupant. Such full expansion causes a shearing force between separator panel 110 and safety flap 130. The slack in the slack flap 113 is taken up while breakaway stitch lines 134 and 133 shear, thereby releasing expansion pleat 136. The slack in expansion fold 136 is taken up and aperture 131 moves linearly with respect to aperture 111, thereby reducing the area of channel 104 through which the inflation gas can flow. The reduction in gas throughput depends upon the size of the seat occupant. The smaller the occupant, the smaller the channel 104. This action of the safety flap 130 and separator panel 110 thereby maintains a greater amount of inflation in the thoracic portion 101 where it is most needed for a longer period of time. Auxiliary aperture 112 is always open to permit at least some inflation gas to flow into the head portion 102. Vent apertures 111 and 131 preferably never fully close venting channel 104.

After the air bag cushion 100 has been inflated, the inflation gas gradually leaks out, leaving a limp air bag cushion.

While the above description contains many specifics, these specifics should not be construed as limitations on the scope of the invention, but merely as exemplifications of preferred embodiments thereof. Many changes and modifications in the above described embodiment of the invention can be carried out without departing from the scope thereof.

For example, the separator panel and safety flap can be fabricated from the same or different material from the air bag cushion exterior walls. The vent apertures can be of various sizes and shapes. The breakaway stitches can be adapted to break at various predetermined thresholds of shearing force. Accordingly, the scope of the invention is intended to be limited only by the scope of the appended claims.

Many changes and modifications in the above described embodiment of the invention can, of course, be carried out without departing from the scope thereof. Accordingly, that scope is intended to be limited only by the scope of the appended claims.

I claim:

1. A side impact restraint system for protecting an occupant of a vehicle comprising:

an inflatable cushion (100) expandable from a compact pre-inflated condition to an inflated condition, the cushion including a first chamber (101a) and a second chamber (102a) and separator means (110) for separating the cushion into the first and second chambers and for controlling the flow of inflation gas therebetween;

an inflator support member (120) receivable within the cushion, the inflator support member including mounting means for mounting the support member to a mounting member of the vehicle;

an inflator (125) for providing inflation gas directly to at least the first chamber of the cushion, the inflator mounted to the inflator support member;

the separator means including a separator panel and a safety flap attached to the separator panel, wherein portions of the separator panel and the safety flap are movable relative to one another as the cushion inflates to create a variable aperture (104);

the separator panel includes a first portion secured to the cushion thus dividing the cushion into the first and second chambers, the separator panel additionally includes a first aperture (111) and a first end (113) secured to the inflator support member;

the safety flap (130) includes a second aperture (131) which is initially maintained registered to the first aperture, a first end portion of the safety flap on one side of the second aperture being formed into an expansion pleat or loop (136), an end of the expansion pleat remote from the second aperture is secured to the separator panel by a permanent connection, the safety flap is also secured to the separator panel by at least one breakable connection which is broken as the cushion inflates, an opposite end of the safety panel being secured to the inflator support member without any significant slack therein; wherein the separator panel, between the location of the breakable connection and its first end, which is secured to the inflator support member, is formed with slack therein; wherein upon inflation of the cushion, the separator panel is tensioned causing the breakable connection to break thereby permitting the expansion pleat to expand permitting portions of the safety flap adjacent the second aperture to move relative to the first aperture obscuring portions of the first aperture (111) thereby creating the variable aperture (104).

2. The restraint system of claim 1 wherein the breakable connection breaks permitting the first and second apertures to move from an initial position to a second position when the first chamber reaches a predetermined degree of inflation.

3. The restraint system of claim 2 wherein the first aperture and the second aperture are both oblong shaped.

4. The restraint system of claim 1 wherein the permanent connection comprises a line of sewn stitches (135) having sufficient strength to remain substantially intact after full inflation of the cushion (100).

5. The restraint system of claim 4 wherein the breakable connection comprises a first line of sewn breakaway stitches (134) configured to release when the first chamber has reached a predetermined degree of inflation.

6. The restraint system of claim 1 wherein the variable aperture regulates the flow of inflation gas from the first chamber (101a) to the second chamber (102a) in proportion to the size of the occupant.

7. The restraint system of claim 1 wherein a portion of the safety flap (130) is linearly movable relative to the first aperture (111).

8. The restraint system of claim 1 wherein the separator panel (110) includes an auxiliary, fixed dimension aperture (112) to provide continuous communication between the first and second chambers.

9. The restraint system of claim 1 wherein the inflator and, cushion are located within the interior of the vehicle seat.

10. The restraint system of claim 9 wherein the cushion when inflated is positioned generally between a seated occupant the a side of the vehicle.

11. The system as defined in claim 1 including a second breakable connection and wherein the breakable connections are located respectively on opposite sides of the registered first and second apertures.

12. The restraint system of claim 11 wherein the second breakable connection comprises a line of sewn breakaway stitches (133).

13. A side impact restraint system for protecting an occupant of a vehicle comprising:

an inflatable cushion (100) expandable from a compact pre-inflated condition to an inflated condition, the cushion including a first chamber (101a) and a second chamber (102a) and separator means (110) for separating the cushion into the first and second chambers and for controlling the flow of inflation gas therebetween;

an inflator (125) for providing inflation gas directly to at least the first chamber of the cushion, support means for supporting the inflator relative to a mounting member of the vehicle;

the separator panel means including a separator panel and a safety flap attached to the separator panel, wherein portions of the separator panel and the safety flap are movable relative to one another as the cushion inflates to create a variable aperture (104);

the separator panel includes a first portion secured to the cushion thus dividing the cushion into the first and second chambers, the separator panel additionally includes a first aperture (111) and a first end (113) secured to the support means;

the safety flap (130) includes a second aperture (131) which is initially maintained registered to the first aperture, a first end portion of the safety flap, on one side of the second aperture being formed into an expansion pleat or loop (136), an end of the expansion pleat remote from the second aperture is secured to the separator panel by a permanent connection, the safety flap is also secured to the separator panel by at least one breakable connection which is broken as the cushion inflates, an opposite end of the safety panel being secured to the support means without any significant slack therein; wherein the separator panel, between the location of the breakable connection and its first end, which is secured to the support means, is formed with slack therein; wherein upon inflation of the cushion, the separator panel is tensioned causing the breakable connection to break thereby permitting the expansion pleat to expand permitting portions of the safety flap adjacent the second aperture to move relative to the first aperture obscuring portions of the first aperture (111) thereby creating the variable aperture (104).

\* \* \* \* \*